(12) United States Patent
Lee et al.

(10) Patent No.: US 8,886,825 B2
(45) Date of Patent: Nov. 11, 2014

(54) APPARATUS AND METHOD FOR ENSURING FAIRNESS OF UDP DATA TRANSMISSION IN ETHERNET ENVIRONMENT

(75) Inventors: Chang-Hoon Lee, Seoul (KR);
Sung-Hak Song, Seongnam-si (KR);
Joong-Bae Jeon, Jecheon-si (KR)

(73) Assignee: Samsung SDS Co., Ltd., Seoul (KR)

( * ) Notice: Subject to any disclaimer, the term of this patent is extended or adjusted under 35 U.S.C. 154(b) by 182 days.

(21) Appl. No.: 13/279,774

(22) Filed: Oct. 24, 2011

(65) Prior Publication Data
US 2012/0110205 A1 May 3, 2012

(30) Foreign Application Priority Data
Oct. 28, 2010 (KR) .................. 10-2010-0106102

(51) Int. Cl.
*G06F 15/16* (2006.01)
*H04L 12/825* (2013.01)
*H04L 12/801* (2013.01)

(52) U.S. Cl.
CPC ............ *H04L 47/263* (2013.01); *H04L 47/193* (2013.01)
USPC ............ 709/233; 709/224; 370/230; 370/235

(58) Field of Classification Search
USPC .......... 709/203, 223, 224, 231, 232, 233, 234
See application file for complete search history.

(56) References Cited

U.S. PATENT DOCUMENTS

| | | | |
|---|---|---|---|
| 7,260,062 B2 | 8/2007 | Bowen, Jr. et al. | |
| 2005/0276221 A1* | 12/2005 | Olesinski et al. | 370/235 |
| 2007/0008884 A1* | 1/2007 | Tang | 370/230 |
| 2008/0144660 A1* | 6/2008 | Godlewski | 370/468 |

FOREIGN PATENT DOCUMENTS

| | | |
|---|---|---|
| JP | 11239173 A | 8/1999 |
| JP | 2006254383 A | 9/2006 |
| JP | 2009529254 A | 8/2009 |
| KR | 10-0864785 B1 | 10/2008 |

OTHER PUBLICATIONS

Communication, dated Feb. 2, 2012, issued by the European Patent Office in corresponding European Application No. 11186604.2.
Sisalem, D et al., "The Loss-Delay Adjustment Algorithm: A TCP-friendly Adaptation Scheme," Jul. 8, 1998, URL:http://www.cs.columbia.edu/hgs/papers/Sisa9807_Loss.pdf, pp. 1-15.

(Continued)

*Primary Examiner* — Barbara Burgess
(74) *Attorney, Agent, or Firm* — Sughrue Mion, PLLC

(57) ABSTRACT

Provided are an apparatus and method for ensuring fairness of user datagram protocol (UDP) data transmission in an Ethernet environment. Transmission control protocol (TCP) transmission rate calculator calculates a current TCP transmission rate based on amount of a TCP data stream transmitted in real time from a transmission apparatus and received by a reception apparatus. TCP transmission rate calculator calculates the optimum transmission rate on the basis of the received amount of a TCP data stream transmitted to the reception apparatus before UDP data transmission of the transmission apparatus is started. When UDP data is transmitted from a transmission apparatus to a reception apparatus, a TCP data stream for determining fairness is transmitted together, so that the apparatus and method can be simplified by adding only the TCP stream without an additional module for estimating a queuing delay time on the basis of a round-trip time (RTT) and so on.

21 Claims, 4 Drawing Sheets

(56) References Cited

OTHER PUBLICATIONS

Yang, Y et al., "Throughput Guarantees for Multi-priority Traffic in Ad Hoc Networks," 2004 IEEE International Conference on Mobile Ad-hoc and Sensor Systems, pp. 379-388.

Kim, J et al., "TCP-Friendly Internet Video Streaming Employing Variable Frame-Rate Encoding and Interpolation," IEEE Transactions on Circuits and Systems for Video Technology, vol. 10, No. 7, Oct. 2000, pp. 1164-1177.

Mehra, P et a., "Receiver-Driven Bandwith Sharing for TCP and its Application to Video Streaming," IEEE Transactions on Multimedia, vol. 7, No. 4, Aug. 2005, pp. 740-752.

Fujikawa, et al., "A Proposal of UDP Congestion Control for Supporting RTT-Fairness", The Institute of Electronics, Information and Communication Engineers Technical Report, vol. 107, No. 525, Mar. 2008, 8 pgs.

* cited by examiner

APPARATUS AND METHOD FOR ENSURING FAIRNESS OF UDP DATA TRANSMISSION IN ETHERNET ENVIRONMENT

CROSS-REFERENCE TO RELATED APPLICATION

This application claims priority to and the benefit of Korean Patent Application No. 2010-0106102, filed on Oct. 28, 2010, the disclosure of which is incorporated herein by reference in its entirety.

BACKGROUND

1. Field of the Invention

The present invention relates to an apparatus and method for ensuring fairness of user datagram protocol (UDP) data transmission in an Ethernet environment and, more particularly, to an apparatus and method for ensuring fairness of other transmission control protocol (TCP) and UDP connections during UDP-based data transmission in an Ethernet-based environment such as the Internet and an intranet.

2. Discussion of Related Art

Fairness in a network environment means ensuring that when a plurality of sessions connected for data transmission pass through a bottleneck of a network path, a specific session does not exclusively use the bottleneck and the plurality of sessions share the bottleneck to fairly perform data communication.

TCP-based data transmission is performed in the form of a stream, and various attempts, such as TCP Tahoe, TCP Reno and TCP Vegas, have been made to ensure fairness with a flow control and congestion control mechanism of the TCP-based data transmission itself. However, characteristics of implementation of the TCP, such as 3-way handshaking and the additive increase/multiplicative-decrease (AIMD) algorithm, result in demerits of long round-trip time (RTT) caused by terminals that are far from each other as in a wide area network (WAN), and data transmission time greatly increasing as packet loss increases.

To overcome these demerits of the TCP, attempts are being made to ensure reliability on the UDP, make a congestion control layer, and enable rapid file transmission in a WAN. Unlike the TCP capable of ensuring fairness somewhat, the UDP is specialized in achieving a data transmission rate close to an available bandwidth, thus relatively lacking attempts to ensure fairness. Also, existing UDP-based data transmission protocols to ensure fairness do not show better transmission and performance ensuring fairness than the TCP or are difficult to implement.

FIG. 1 is a block diagram showing the constitution of an existing UDP-based data transmission system. Referring to FIG. 1, a transmission apparatus 100 of a UDP-based data transmission system includes a UDP data transmitter 110 and a UDP transmission rate controller 120, and a reception apparatus 200 includes a UDP data receiver 210 and a UDP reception data information provider 220. The UDP data transmitter 110 of the transmission apparatus 100 divides and contains data of a file or memory in UDP datagrams and transmits the datagrams to the reception apparatus 200. The UDP data receiver 210 of the reception apparatus 200 receives the datagrams transmitted from the transmission apparatus 100, and the UDP reception data information provider 220 checks the received datagrams and transmits reception data information such as a lost packet and a transmission rate to the transmission apparatus 100.

The UDP transmission rate controller 120 of the transmission apparatus 100 calculates the optimum UDP data transmission rate using the received reception data information, thereby enabling data communication at a transmission rate that is faster than that of the TCP and close to an available bandwidth. This method is not appropriate for ensuring fairness because the data transmission rate is simply calculated from a datagram loss rate.

FIG. 2 is a block diagram showing a constitution for ensuring fairness in an existing UDP-based data transmission protocol. Referring to FIG. 2, the reception apparatus 200 further includes an RTT calculator 230, a delay time estimator 240, and a fairness determiner 250 as components for ensuring fairness. The RTT calculator 230 of the reception apparatus 200 calculates an RTT based on datagrams transmitted from the transmission apparatus 100, and the delay time estimator 240 estimates a queuing delay time using the calculated RTT. If a data transmission rate is not reduced even when the queuing delay time increases, the fairness determiner 250 determines that fairness has deteriorated and transmits the determination to the transmission apparatus 100 through the UDP reception data information provider 220.

The constitution makes use of a characteristic that a queuing delay time increases when a buffer of a router overflows at a bottleneck of a network path through which data packets pass. In this constitution, the transmission apparatus 100 reduces a transmission rate on the basis of information received from the reception apparatus 200 until the queuing delay time is restored to a normal state, thereby ensuring fairness.

Such a method of ensuring fairness of data transmission using a queuing delay time needs to accurately sense minute increases and decreases through an operating system (OS) in use and an implementation language. To estimate a queuing delay time, an RTT error generally needs to be 10 ms or less, and to obtain such a small permissible error, the OS needs to schedule calculation of a queuing delay time as a prior process.

Also, network socket programs developed in languages other than C, including Java and Python, show an error of 40 ms or more, and thus cannot calculate a queuing delay time. In particular, when a device, such as a smartphone, has poor hardware and software performance, a queuing delay time cannot be calculated in the application layer.

SUMMARY OF THE INVENTION

The present invention is directed to providing an apparatus and method for ensuring fairness of user datagram protocol (UDP) data transmission in an Ethernet environment, which can be implemented using low-performance hardware and software, and do not require an operating system (OS) to support scheduling of calculation of a queuing delay time.

The present invention is also directed to providing a computer-readable recording medium storing a program for executing a method of ensuring fairness of UDP data transmission in an Ethernet environment, which can be implemented using low-performance hardware and software, and do not require an OS to support scheduling of calculation of a queuing delay time.

According to an aspect of the present invention, there is provided an apparatus for ensuring fairness of UDP data transmission between a transmission apparatus and a reception apparatus constituting an Ethernet environment. The apparatus includes: a transmission control protocol (TCP) transmission rate calculator configured to calculate a current TCP transmission rate on the basis of the amount of a TCP data stream transmitted in real time from the transmission apparatus and received by the reception apparatus; a UDP transmission rate calculator configured to calculate a UDP transmission rate on the basis of the amount of UDP data transmitted with the TCP data stream from the transmission apparatus and received by the reception apparatus; and a fairness determiner configured to transmit a control signal to a UDP transmission rate control means included in the transmission apparatus when a difference between the current TCP transmission rate and a predetermined optimum transmission rate is a predetermined threshold value or more and the UDP transmission rate is increasing. Here, the TCP transmission rate calculator calculates the optimum transmission rate on the basis of the received amount of a TCP data stream transmitted to the reception apparatus before UDP data transmission of the transmission apparatus is started.

According to another aspect of the present invention, there is provided a method of ensuring fairness of UDP data transmission between a transmission apparatus and a reception apparatus constituting an Ethernet environment. The method includes: (a) calculating a current TCP transmission rate on the basis of the amount of a TCP data stream transmitted in real time from the transmission apparatus and received by the reception apparatus; (b) calculating a UDP transmission rate on the basis of the amount of UDP data transmitted with the TCP data stream from the transmission apparatus and received by the reception apparatus; and (c) transmitting a control signal to a UDP transmission rate control means included in the transmission apparatus when a difference between the current TCP transmission rate and a predetermined optimum transmission rate is a predetermined threshold value or more and the UDP transmission rate is increasing. Here, the optimum transmission rate is calculated on the basis of the received amount of a TCP data stream transmitted to the reception apparatus before UDP data transmission of the transmission apparatus is started.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 3:
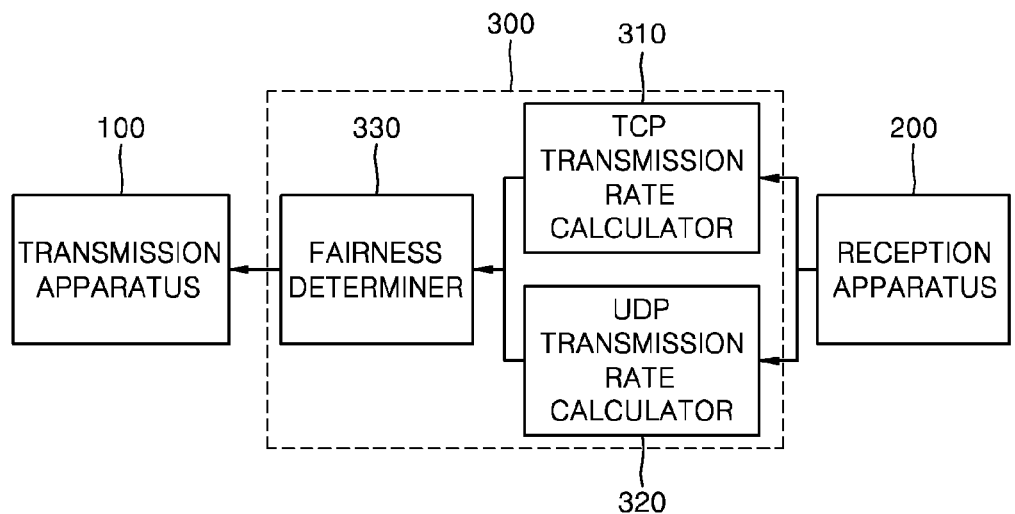
FIG. 3 is a block diagram showing the constitution of an apparatus for ensuring fairness of UDP data transmission in an Ethernet environment according to an exemplary embodiment of the present invention.

FIG. 3 is a block diagram showing the constitution of an apparatus for ensuring fairness of user datagram protocol (UDP) data transmission in an Ethernet environment according to an exemplary embodiment of the present invention.

Referring to FIG. 3, an apparatus 300 for ensuring fairness of UDP data transmission according to an exemplary embodiment of the present invention includes a transmission control protocol (TCP) transmission rate calculator 310, a UDP transmission rate calculator 320, and a fairness determiner 330. The apparatus 300 for ensuring fairness of UDP data transmission according to an exemplary embodiment of the present invention may be included in one of a transmission apparatus 100 and a reception apparatus 200. In other words, the apparatus 300 may be included in the transmission apparatus 100 to calculate a transmission rate on the basis of reception data information provided by the reception apparatus 200, determine fairness, and adjust a UDP data transmission rate of the transmission apparatus 100 as described above, or may be included in the reception apparatus 200 to perform transmission rate calculation and fairness determination and then transmit the result to the transmission apparatus 100.

Figure 4:
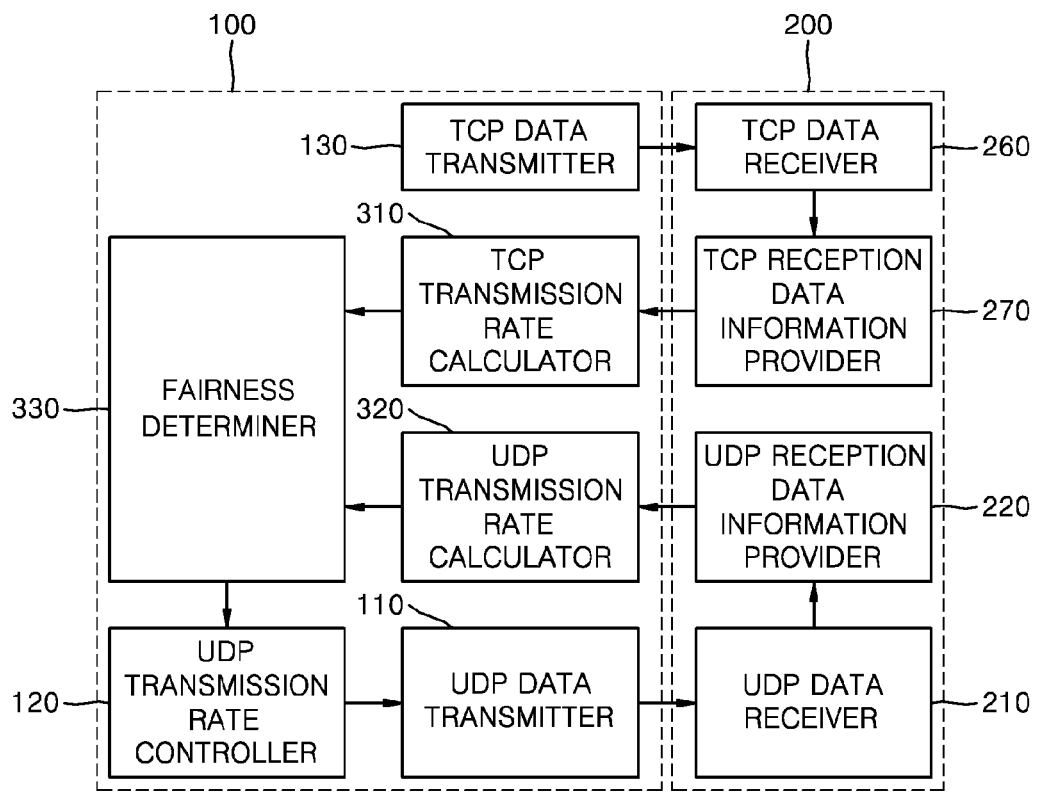
FIG. 4 is a block diagram of a transmission apparatus including an apparatus for ensuring fairness of UDP data transmission according to an exemplary embodiment of the present invention.

A case in which the respective components of the apparatus 300 for ensuring fairness of UDP data transmission according to an exemplary embodiment of the present invention are included in the transmission apparatus 100 will be described below as a typical exemplary embodiment. FIG. 4 is a block diagram of the transmission apparatus 100 including the apparatus 300 for ensuring fairness of UDP data transmission according to an exemplary embodiment of the present invention.

Figure 1:
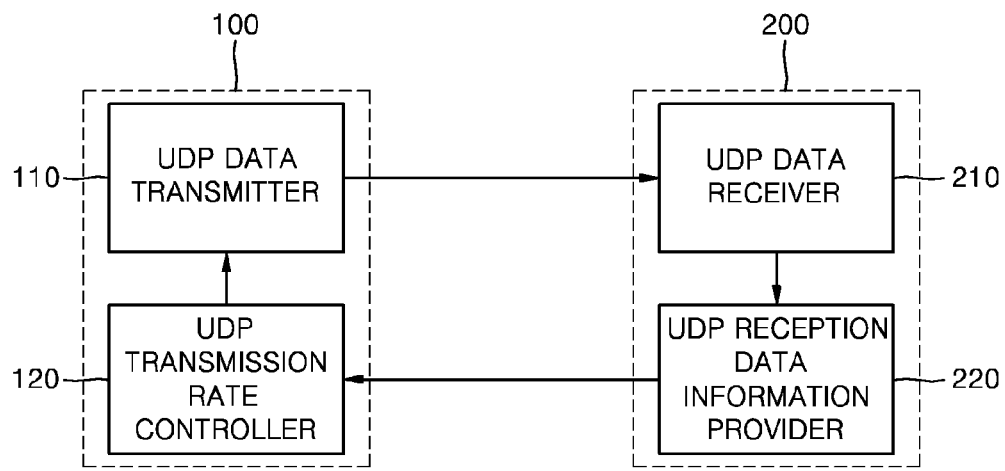
FIG. 1 is a block diagram showing the constitution of an existing user datagram protocol (UDP)-based data transmission system.
Figure 2:
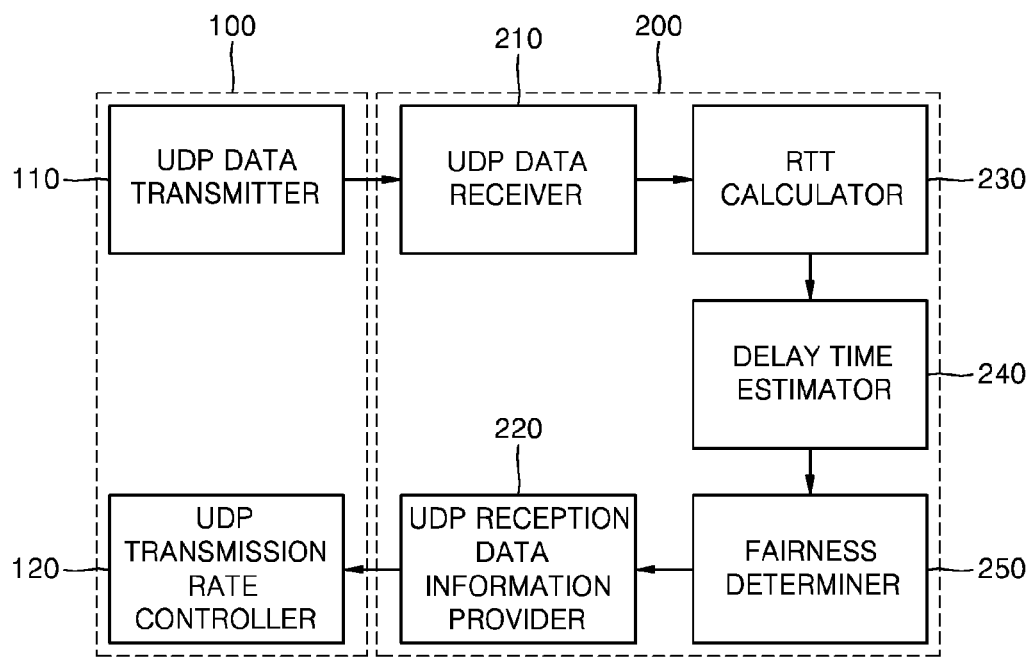
FIG. 2 is a block diagram showing a constitution for ensuring fairness in an existing UDP-based data transmission protocol.

Referring to FIG. 4, the transmission apparatus 100 includes a TCP data transmitter 130 for TCP streams in addition to the UDP data transmitter 110 and the UDP transmission rate controller 120, which are components shown in FIG. 1, and the TCP transmission rate calculator 310, the UDP transmission rate calculator 320 and the fairness determiner 330, which are the components of the apparatus 300 for ensuring fairness of UDP data transmission according to an exemplary embodiment of the present invention. Also, the reception apparatus 200 includes a TCP data receiver 260 and a TCP reception data information provider 270 in addition to the UDP data receiver 210 and the UDP reception data information provider 220, which are components shown in FIG. 1.

The block diagram of FIG. 4 shows a case in which the respective components are separated for convenience, and may be modified so that TCP and UDP transmission rates are calculated by the fairness determiner 330, a UDP transmission rate is calculated by the UDP transmission rate controller 120, or so on.

When the transmission apparatus 100 and the reception apparatus 200 have the constitution as shown in FIG. 4, the transmission apparatus 100 first transmits a TCP data stream alone to check the maximum rate that can be ensured by the TCP data stream alone. Thereafter, the transmission apparatus 100 starts UDP data transmission to the reception apparatus 200 and simultaneously transmits a TCP data stream for fairness determination together, thereby determining fairness of data transmission between the transmission apparatus 100 and the reception apparatus 200. According to the determination result, the transmission apparatus 100 controls its UDP data transmission rate. In this way, it is possible to prevent deterioration of fairness caused by offensive UDP data transmission in which another network connection is not considered.

An input and output relation between the respective components shown in FIG. 4 and operation of the respective components will be described in detail below.

As described above, the TCP data transmitter 130 of the transmission apparatus 100 first transmits a TCP data stream to the reception apparatus 200 before UDP data transmission is started. At this time, transmission of the TCP data stream is performed for a predetermined time (e.g., 0.5 second or five seconds), and the transmission rate of the transmission apparatus 100 is set to be sufficiently high in comparison with a bandwidth of network equipment in which the transmission apparatus 100 is currently disposed. The TCP data receiver 260 of the reception apparatus 200 receives the TCP data stream, and the TCP reception data information provider 270 checks the size of data received for the predetermined time and transmits the resultant information to the transmission apparatus 100.

The TCP transmission rate calculator 310 of the transmission apparatus 100 calculates an actual transmission rate of the TCP data stream on the basis of the received reception data size and determines the calculated transmission rate as an optimum transmission rate. The calculated optimum transmission rate is subsequently used to set a transmission rate of a TCP data stream simultaneously transmitted with UDP data when UDP data transmission is started.

After the optimum transmission rate of a TCP data stream is determined as described above, the UDP data transmitter 110 starts UDP data transmission to the reception apparatus 200, and the TCP data transmitter 130 transmits a TCP data stream for fairness determination to the reception apparatus 200 as soon as the UDP data transmission is started. The transmission of the TCP data stream simultaneously performed with the UDP data transmission is repeated until the UDP data transmission is complete. Also, the transmission rate of the TCP data stream simultaneously transmitted with the UDP data from the transmission apparatus 100 is set to the previously calculated optimum transmission rate or higher.

The TCP data receiver 260 and the UDP data receiver 210 of the reception apparatus 200 receive the data transmitted from the TCP data transmitter 130 and the UDP data transmitter 110 respectively, and the TCP reception data information provider 270 and the UDP reception data information provider 220 provide information of the same size as the received TCP data and UDP data to the transmission apparatus 100 respectively.

The TCP transmission rate calculator 310 calculates a current TCP transmission rate on the basis of the amount of the currently transmitted TCP data stream received by the reception apparatus 200, and the UDP transmission rate calculator 320 calculates a UDP transmission rate on the basis of the size of the UDP data received by the reception apparatus 200. On the basis of the calculated current TCP transmission rate and the optimum transmission rate previously calculated and stored by the TCP transmission calculator 310, the fairness determiner 330 determines fairness of data transmission between the transmission apparatus 100 and the reception apparatus 200.

More specifically, when the current TCP transmission rate is the optimum transmission rate or more, the fairness determiner 330 determines that fairness of data transmission between the transmission apparatus 100 and the reception apparatus 200 has not deteriorated. Also, the TCP transmission rate calculator 310 updates the value of the stored optimum transmission rate with the value of the calculated current TCP transmission rate. Subsequently, the updated optimum transmission rate is used for transmission of a TCP data stream and fairness determination.

Also, when the current TCP transmission rate is less than the optimum transmission rate and a difference between the current TCP transmission rate and the optimum transmission rate is a predetermined threshold value or more, the fairness determiner 330 determines whether or not fairness has deteriorated according to a change in the UDP transmission rate calculated by the UDP transmission rate calculator 320.

More specifically, when the UDP transmission rate is currently increasing, the fairness determiner 330 determines that the UDP data transmission of the transmission apparatus 100 is affecting fairness, and informs the UDP transmission rate controller 120 of the determination. As a component that adjusts a transmission rate at which the UDP data transmitter 110 transmits UDP data to the reception apparatus 200, the UDP transmission rate controller 120 adjusts the transmission rate of UDP data such that fairness does not deteriorate when a control signal is input from the fairness determiner 330.

On the other hand, when it is determined that the UDP transmission rate is currently decreasing or maintained at a constant value, the fairness determiner 330 determines that the current TCP transmission rate is reduced not due to the UDP data but due to an increase in network use of another process, and does not transmit a control signal for transmission rate adjustment to the UDP transmission rate controller 120. However, the TCP transmission rate calculator 310 updates the value of the optimum transmission rate with the value of the current TCP transmission rate.

Finally, when the current TCP transmission rate is less than a predetermined minimum, the fairness determiner 330 determines that fairness of the UDP data transmission of the transmission apparatus 100 has deteriorated regardless of a current state of the UDP transmission rate. Thus, the fairness determiner 330 transmits a control signal to the UDP transmission rate controller 120 to adjust the transmission rate of the UDP data.

As described above, the apparatus 300 for ensuring fairness of UDP data transmission is included in the transmission apparatus 100 or the reception apparatus 200 in an Ethernet environment and uses a method of ensuring fairness by transmitting a TCP data stream together when UDP data transmission is performed, thereby ensuring fairness of UDP data transmission without an additional module for implementing the above-described conventional method of estimating a queuing delay time on the basis of a round-trip time (RTT).

Unlike a conventional method in which resources of an operating system (OS) need to be directly accessed to accurately measure an RTT and which needs to be implemented in C, etc. for high performance, the apparatus 300 can be implemented using any platform and development language enabling Ethernet socket programming and can also be implemented in a system, such as a smartphone, having low hardware and software performance, so that fairness can be ensured in various devices.

As an example to which the apparatus 300 for ensuring fairness of UDP data transmission according to an exemplary embodiment of the present invention is applied, a case in which a smartphone transmits attachment file data of a large-capacity email will be described.

In this case, when datagrams are transmitted at a high rate using a UDP-based data transmission protocol for fast data transmission compared with the TCP, the attachment file of the large-capacity email can be transmitted at the high rate, but network connection of another process (e.g., web surfing and the file transfer protocol (FTP)) and cross traffic of computers in the same network environment lag and are slowly processed or cut off. This is caused by offensive UDP data transmission in which another network connection is not considered.

If the apparatus 300 for ensuring fairness of UDP data transmission according to an exemplary embodiment of the present invention is applied to this case, the entire available bandwidth is used to perform UDP data transmission when no cross traffic is present, and a UDP data transmission rate is adjusted such that cross traffic is not affected when another process uses a network or cross traffic is present, so that fairness can be ensured.

For UDP data transmission, a user may select whether to perform transmission while ensuring fairness or rapid data transmission without ensuring fairness. Even when the user makes a selection to ensure fairness, how much cross traffic will be considered may be set in advance. Also, the number of TCP data transmission sockets may be one or more to improve accuracy of fairness determination.

Figure 5:
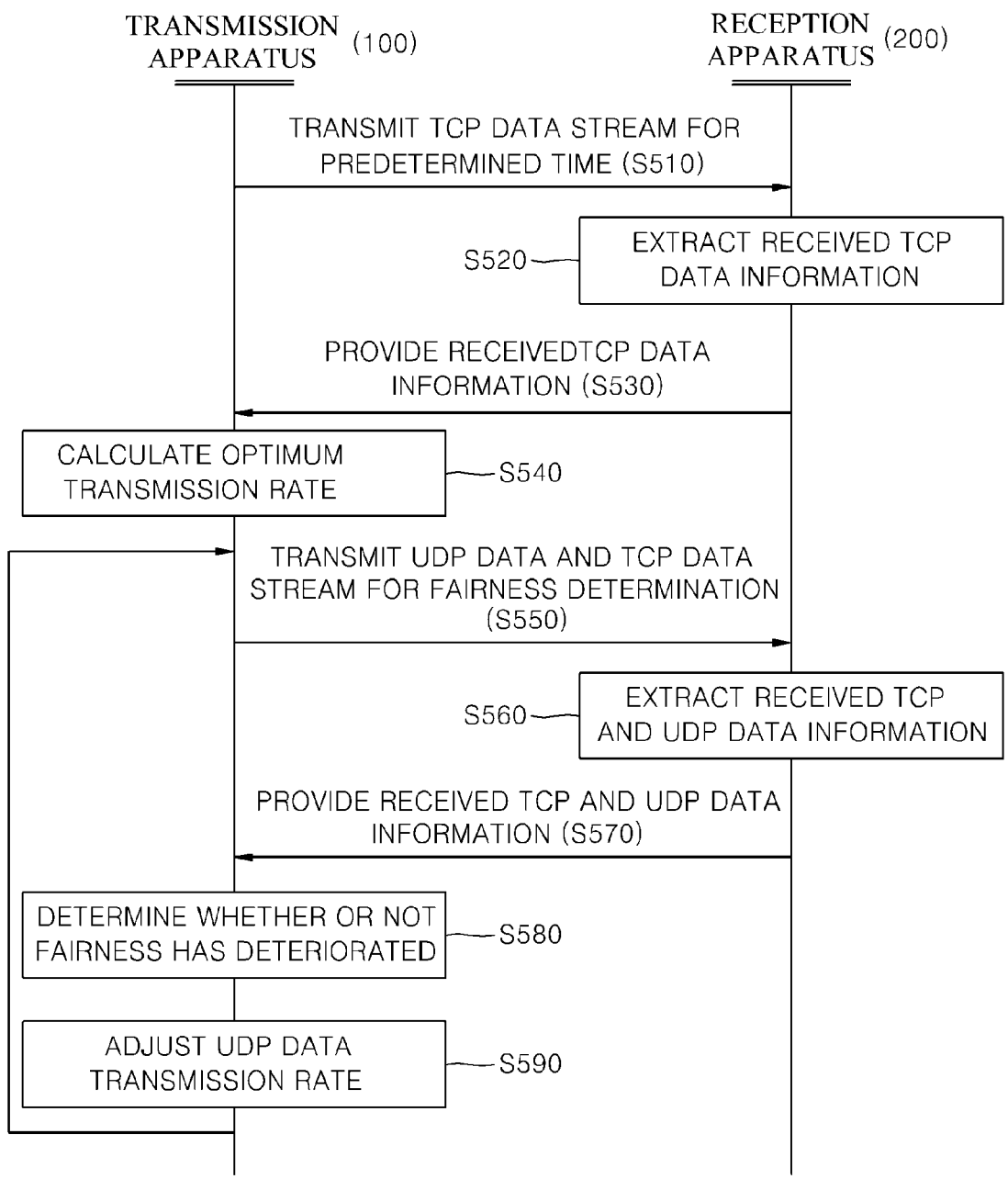
FIG. 5 is a flowchart illustrating an example of data transmission for ensuring fairness between a transmission apparatus and a reception apparatus in an Ethernet environment.

FIG. 5 is a flowchart illustrating an example of data transmission for ensuring fairness between the transmission apparatus 100 and the reception apparatus 200 in an Ethernet environment. The flowchart of FIG. 5 illustrates a case in which the apparatus 300 for ensuring fairness of UDP data transmission according to an exemplary embodiment of the present invention is included in the transmission apparatus 100.

Referring to FIG. 5, the TCP data transmitter 130 of the transmission apparatus 100 transmits a TCP data stream to the reception apparatus 200 for a predetermined time (S510). The TCP reception data information provider 270 of the reception apparatus 200 extracts TCP data information received by the TCP data receiver 260 (S520) and provides the extracted TCP data information to the transmission apparatus 100 (S530). The TCP transmission rate calculator 310 of the transmission apparatus 100 calculates an optimum transmission rate on the basis of the provided information (S540).

Subsequently, the UDP data transmitter 110 starts UDP data transmission to the reception apparatus 200. At this time, the TCP data transmitter 130 simultaneously transmits a TCP data stream for fairness determination as well as UDP data to the reception apparatus 200 (S550). The TCP reception data information provider 270 and the UDP reception data information provider 220 of the reception apparatus 200 extract received TCP and UDP data information (S560) and provide the extracted TCP and UDP data information to the transmission apparatus 100 (S570), and the apparatus 300 for ensuring fairness of UDP data transmission according to an exemplary embodiment of the present invention included in the transmission apparatus 100 determines whether or not fairness has deteriorated on the basis of TCP and UDP transmission rates (S580). According to the determination result, the transmission rate of UDP data is adjusted (S590).

Figure 6:
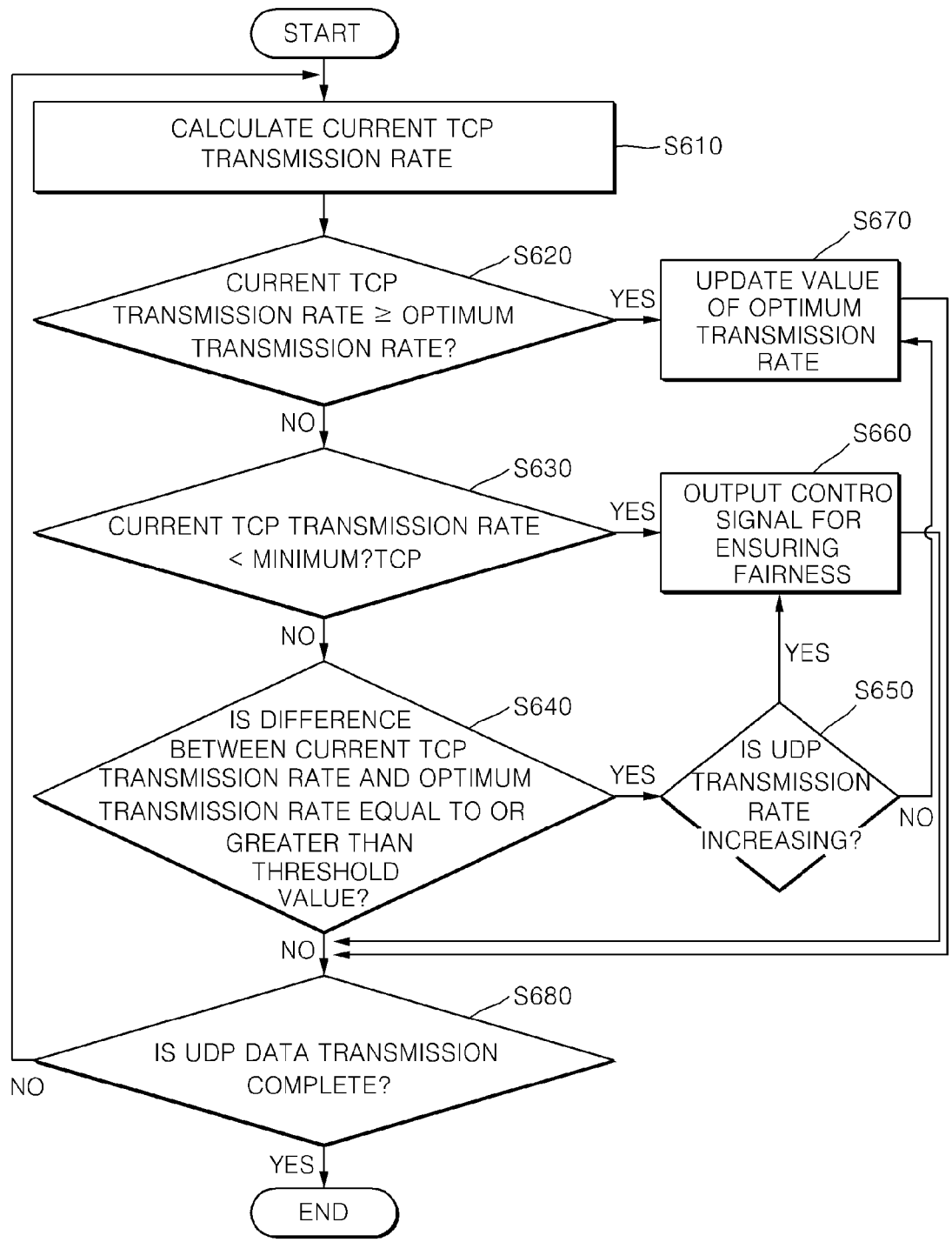
FIG. 6 is a flowchart illustrating a method of ensuring fairness of UDP data transmission according to an exemplary embodiment of the present invention.

FIG. 6 is a flowchart illustrating a method of ensuring fairness of UDP data transmission according to an exemplary embodiment of the present invention. Like FIG. 5, the flowchart of FIG. 6 illustrates a case in which the apparatus 300 for ensuring fairness of UDP data transmission according to an exemplary embodiment of the present invention is included in the transmission apparatus 100.

Referring to FIG. 6, the TCP transmission rate calculator 310 calculates a current TCP transmission rate (S610), and the UDP transmission rate calculates a UDP transmission rate. The fairness determiner 330 determines whether or not the current TCP transmission rate is less than an optimum transmission rate that has been calculated and stored in advance (S620). When the current TCP transmission rate is less than the optimum transmission rate and a previously set minimum, the fairness determiner 330 outputs a control signal that causes the UDP transmission rate controller 120 to adjust a UDP data transmission rate to within a range that ensures fairness (S660).

Meanwhile, when a difference between the current TCP transmission rate and the optimum transmission rate is a previously set threshold value or more (S640) and the UDP transmission rate is currently increasing (S650), the fairness determiner 330 also outputs the control signal that causes the UDP transmission rate controller 120 to adjust a UDP data transmission rate to within a range that ensures fairness (S660).

When the current TCP transmission rate is the optimum transmission rate or more (S620), the difference between the current TCP transmission rate and the optimum transmission rate is the threshold value or more (S640), and the UDP transmission rate is not increasing (S650), the TCP transmission rate calculator 310 updates the value of the optimum transmission rate with the value of the current TCP transmission rate (S670).

The above-described process is repeated until transmission of UDP data, which is a transmission target, is complete (S680).

In an apparatus and method for ensuring fairness of UDP data transmission in an Ethernet environment according to exemplary embodiments of the present invention, a TCP data stream for determining fairness is transmitted together when UDP data is transmitted from a transmission apparatus to a reception apparatus, so that the constitution of the apparatus and method can be simplified by adding only the TCP stream without an additional module for estimating a queuing delay time on the basis of an RTT and so on. Also, the apparatus and method can be implemented using any platform and development language enabling Ethernet socket programming, and can also be applied to a device, such as a smartphone, having low hardware and software performance because no additional module is used.

Exemplary embodiment of the present invention can be embodied as computer-readable codes on a computer-readable recording medium. The computer-readable recording medium includes all kinds of recording devices storing data which can be read by computer systems. Examples of computer-readable recording media include a read-only memory (ROM), random-access memory (RAM), compact disc (CD)-ROM, magnetic tape, floppy disk, and optical data storage, and further include an implementation in carrier waves (e.g., transmission over the Internet). Also, the computer-readable recording medium may be distributed among computer systems connected through a network and stored and executed as a code that can be read in a de-centralized method.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for ensuring fairness of user datagram protocol (UDP) data transmission between a transmission apparatus and a reception apparatus constituting an Ethernet environment, the apparatus comprising:
   a processor configured to control the apparatus to implement:
   a transmission control protocol (TCP) transmission rate calculator configured to calculate a current TCP transmission rate on the basis of an amount of a TCP data stream transmitted in real time from the transmission apparatus and received by the reception apparatus;
   a UDP transmission rate calculator configured to calculate a UDP transmission rate on the basis of an amount of UDP data transmitted with the TCP data stream from the transmission apparatus and received by the reception apparatus; and
   a fairness determiner configured to determine that the UDP data transmission is affecting data transmission fairness if a difference between the current TCP transmission rate and a predetermined optimum TCP transmission rate is a predetermined threshold value or more and if the UDP transmission rate is increasing and configured to transmit a control signal indicating that the UDP data transmission is affecting the data transmission fairness to a UDP transmission rate control means for adjusting the UDP transmission rate included in the transmission apparatus in response to determining that the UDP data transmission is affecting the data transmission fairness,
   wherein the TCP transmission rate calculator calculates the optimum TCP transmission rate on the basis of a received amount of a TCP data stream transmitted to the reception apparatus before UDP data transmission of the transmission apparatus is started.

2. The apparatus of claim 1, wherein the TCP transmission rate calculator updates a value of the optimum TCP transmission rate with a value of the current TCP transmission rate when a difference between the current TCP transmission rate and the predetermined optimum TCP transmission rate is the predetermined threshold value or more and the UDP transmission rate is not increasing.

3. The apparatus of claim 1, wherein the TCP transmission rate calculator updates the value of the optimum TCP transmission rate with the value of the current TCP transmission rate when the current TCP transmission rate is the predetermined optimum TCP transmission rate or more.

4. The apparatus of claim 1, wherein the fairness determiner transmits the control signal to the UDP transmission rate control means when the current TCP transmission rate is less than a predetermined minimum.

5. The apparatus of claim 1, wherein the TCP data stream is repeatedly transmitted until the UDP data transmission is complete.

6. The apparatus of claim 1, wherein the received amount is calculated from an amount of packets lost when the TCP data stream is transmitted from the transmission apparatus to the reception apparatus, and a data transmission rate.

7. The apparatus of claim 1, wherein the apparatus is included in the transmission apparatus and transmits the TCP data stream and the UDP data to the reception apparatus.

8. A method of ensuring fairness of user datagram protocol (UDP) data transmission between a transmission apparatus and a reception apparatus constituting an Ethernet environment, the method comprising:
   (a) calculating, by a processor of the transmission apparatus, a current transmission control protocol (TCP) transmission rate on the basis of an amount of a TCP data stream transmitted in real time from the transmission apparatus and received by the reception apparatus;
   (b) calculating, by the processor of the transmission apparatus, a UDP transmission rate on the basis of an amount of UDP data transmitted with the TCP data stream from the transmission apparatus and received by the reception apparatus; and
   (c) determining that the UDP transmission data is affecting data transmission fairness if a difference between the current TCP transmission rate and a predetermined optimum TCP transmission rate is a predetermined threshold value or more and if the UDP transmission rate is increasing and transmitting a control signal indicating that the UNP data transmission is affecting the data transmission fairness to a UDP transmission rate control means for adjusting the UDP transmission rate included in the transmission apparatus in response to determining that the UDP data transmission is affecting the data transmission fairness,
   wherein the optimum TCP transmission rate is calculated on the basis of a received amount of a TCP data stream transmitted to the reception apparatus before UDP data transmission of the transmission apparatus is started.

9. The method of claim 8, further comprising (d) updating a value of the optimum TCP transmission rate with a value of the current TCP transmission rate when a difference between the current TCP transmission rate and the predetermined optimum TCP transmission rate is the predetermined threshold value or more and the UDP transmission rate is not increasing.

10. The method of claim 8, further comprising (e) updating the value of the optimum TCP transmission rate with the value of the current TCP transmission rate when the current TCP transmission rate is the predetermined optimum TCP transmission rate or more.

11. The method of claim 8, further comprising (f) transmitting the control signal to the UDP transmission rate control means when the current TCP transmission rate is less than a predetermined minimum.

12. The method of claim 8, wherein the TCP data stream is repeatedly transmitted until the UDP data transmission is complete, and
   steps (a) to (c) are repeatedly performed.

13. The method of claim 8, wherein step (c) includes adjusting the UDP transmission rate so that a connection with the reception apparatus in the Ethernet environment ensures fairness of another network connection.

14. The method of claim 8, wherein the received amount is calculated from an amount of packets lost when the TCP data stream is transmitted from the transmission apparatus to the reception apparatus, and a data transmission rate.

15. A method of ensuring fairness of user datagram protocol (UDP) data transmission, comprising:
   (a) calculating, by a processor of the reception apparatus, a current transmission control protocol (TCP) transmission rate on the basis of an amount of a TCP data stream received in real time from a transmission apparatus constituting an Ethernet environment;
   (b) calculating, by the processor of the reception apparatus, a UDP transmission rate on the basis of an amount of UDP data received with the TCP data stream from the transmission apparatus; and
   (c) transmitting to the transmission apparatus a control signal indicating the UDP data transmission is affecting data transmission fairness causing the transmission apparatus to adjust the UDP transmission rate included in the transmission apparatus if a difference between the current TCP transmission rate and a predetermined optimum TCP transmission rate is a predetermined threshold value or more and if the UDP transmission rate is increasing, wherein the optimum TCP transmission rate is calculated on the basis of an amount of a TCP data stream received before UDP data transmission of the transmission apparatus is started.

16. The method of claim 15, further comprising (d) updating a value of the optimum TCP transmission rate with a value of the current TCP transmission rate when a difference between the current TCP transmission rate and the predetermined optimum TCP transmission rate is the predetermined threshold value or more and the UDP transmission rate is not increasing.

17. The method of claim 15, further comprising (e) updating the value of the optimum TCP transmission rate with the value of the current TCP transmission rate when the current TCP transmission rate is the predetermined optimum TCP transmission rate or more.

18. The method of claim 15, further comprising (f) transmitting the control signal to the UDP transmission rate control means when the current TCP transmission rate is less than a predetermined minimum.

19. The method of claim 15, wherein the TCP data stream is repeatedly transmitted until the UDP data transmission is complete, and steps (a) to (c) are repeatedly performed.

20. A non-transitory computer-readable recording memory storing a program for executing the method of ensuring fairness of UDP data transmission according to claim 8 in a computer.

21. A method of controlling a transmission rate of user datagram protocol (UDP) data transmission between a transmission apparatus and a reception apparatus based on a transmission control protocol (TCP) data transmission rate, the method comprising:

transmitting, by the transmission apparatus, a TCP data stream and a UDP data transmission from the transmission apparatus to the reception apparatus;

comparing a transmission rate of the TCP data stream between the transmission apparatus and the reception apparatus to an optimum TCP transmission rate of the TCP data stream between the transmission apparatus and the reception apparatus; and adjusting, by the transmission apparatus, a transmission rate of the UDP data transmission between the transmission apparatus and the reception apparatus based on a result of the comparing indicating that a difference between the transmission rate of the TCP data stream between the transmission apparatus and the reception apparatus and the optimum TCP transmission rate of the TCP data stream between the transmission apparatus and the reception apparatus is a predetermined threshold value or more.

* * * * *